(12) United States Patent
Dalal et al.

(10) Patent No.: US 8,359,237 B2
(45) Date of Patent: Jan. 22, 2013

(54) SYSTEM AND METHOD FOR CONTEXT AND COMMUNITY BASED CUSTOMIZATION FOR A USER EXPERIENCE

(75) Inventors: Vipul C. Dalal, Sunnyvale, CA (US); Eric Noel Billingsley, Campbell, CA (US); James Ladd, San Jose, CA (US); Sanjay Pundlkrao Ghatare, San Jose, CA (US); Randall Scott Shoup, San Francisco, CA (US); Suhail Ansari, Sunnyvale, CA (US); Gunshekar Cemballi, Cupertino, CA (US); Neelakantan Sundaresan, Mountain View, CA (US)

(73) Assignee: eBay Inc., San Jose, CA (US)

( * ) Notice: Subject to any disclaimer, the term of this patent is extended or adjusted under 35 U.S.C. 154(b) by 1027 days.

(21) Appl. No.: 12/126,709

(22) Filed: May 23, 2008

(65) Prior Publication Data
US 2009/0292584 A1 Nov. 26, 2009

(51) Int. Cl.
*G06Q 30/00* (2012.01)
(52) U.S. Cl. ............... 705/14.66; 705/14.53; 705/14.67; 705/14.6
(58) Field of Classification Search .................... 705/10, 705/14.66; 345/744
See application file for complete search history.

(56) References Cited

U.S. PATENT DOCUMENTS

| | | | | |
|---|---|---|---|---|
| 5,991,735 A * | 11/1999 | Gerace | ........................ | 705/7.33 |
| 6,564,170 B2 * | 5/2003 | Halabieh | ...................... | 702/181 |
| 6,631,184 B1 * | 10/2003 | Weiner | ...................... | 379/92.01 |
| 6,842,877 B2 * | 1/2005 | Robarts et al. | ................ | 715/708 |
| 6,981,040 B1 * | 12/2005 | Konig et al. | .................. | 709/224 |
| 7,263,663 B2 * | 8/2007 | Ballard et al. | ................ | 715/762 |
| 8,099,178 B2 * | 1/2012 | Mairs et al. | ...................... | 700/19 |
| 2004/0066401 A1 * | 4/2004 | Bushey et al. | ................ | 345/744 |
| 2005/0108001 A1 * | 5/2005 | Aarskog | ......................... | 704/10 |
| 2006/0200749 A1 | 9/2006 | Shenfield | | |
| 2007/0055757 A1 * | 3/2007 | Mairs et al. | ................... | 709/223 |
| 2007/0100867 A1 | 5/2007 | Celik et al. | | |

(Continued)

FOREIGN PATENT DOCUMENTS

WO WO-2009142768 A1 11/2009

OTHER PUBLICATIONS

"U.S. Appl. No. 12/315,687, Non Final Office Action mailed Nov. 10, 2011", 16 pgs.
"U.S. Appl. No. 12/315,687, Response filed Mar. 12, 2012 to Non Final Office Action mailed Nov. 10, 2011", 10 pgs.

(Continued)

*Primary Examiner* — Seye Iwarere
(74) *Attorney, Agent, or Firm* — Schwegman Lundberg & Woessner, P.A.

(57) ABSTRACT

A system and method for context and community based customization for a user experience is disclosed. The apparatus in an example embodiment includes a user experience customizer to gather context information, automatically produce user experience customization selections based on the context information, collect user activity feedback from a community of users, and use the user activity feedback to adjust the user experience customizer to automatically produce user experience customization selections likely favored by a user based on a correlation of the user activity feedback with the context information.

26 Claims, 5 Drawing Sheets

U.S. PATENT DOCUMENTS

| | | |
|---|---|---|
| 2007/0174390 A1* | 7/2007 | Silvain et al. .................. 709/204 |
| 2007/0180386 A1* | 8/2007 | Ballard et al. ................. 715/744 |
| 2007/0208724 A1 | 9/2007 | Madhavan et al. |
| 2008/0005161 A1 | 1/2008 | Grealish et al. |
| 2008/0021918 A1* | 1/2008 | Rao .............................. 707/102 |
| 2009/0063500 A1 | 3/2009 | Zhai et al. |
| 2010/0083217 A1 | 4/2010 | Dalal et al. |

OTHER PUBLICATIONS

"International Application Serial No. PCT/US2009/003187, Search Report mailed Jul. 29, 2009", 4 pgs.

"International Application Serial No. PCT/US2009/003187, Written Opinion mailed Jul. 29, 2009", 5 pgs.

* cited by examiner

SYSTEM AND METHOD FOR CONTEXT AND COMMUNITY BASED CUSTOMIZATION FOR A USER EXPERIENCE

BACKGROUND

Copyright Notice

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2007-2008, eBay Inc., All Rights Reserved.

1. Technical Field

This disclosure relates to methods and systems supporting computing and data processing systems. More particularly, a system and method for context and community based customization for a user experience is described.

2. Related Art

Conventional systems, like Amazon.com, can use a buyer's previously purchased product or product category/genre to suggest new products in a same or similar category/genre for the user. However, these prior systems are typically one-dimensional. That is, one-dimensional input (e.g. product category/genre) leads to one-dimensional output (e.g. new products in a same or similar category/genre). These conventional systems cannot provide multi-dimensional context analysis to provide a multi-dimensional output based on (customized from) a collection of activity from a community of users gathered over time.

U.S. Pat. No. 6,981,040 describes a method for providing automatic, personalized information services to a computer user including the following steps: transparently monitoring user interactions with data during normal use of the computer; updating user-specific data files including a set of user-related documents; estimating parameters of a learning machine that define a User Model specific to the user, using the user-specific data files; analyzing a document to identify its properties; estimating the probability that the user is interested in the document by applying the document properties to the parameters of the User Model; and providing personalized services based on the estimated probability. Personalized services include personalized searches that return only documents of interest to the user, personalized crawling for maintaining an index of documents of interest to the user; and personalized navigation that recommends interesting documents that are hyperlinked to documents currently being viewed.

U.S. Published Patent Application No. 2007/0100867 describes a method for providing advertising content for display in a page over a network. A plurality of advertisements are determined that are qualified for display at a location in the page. When an advertiser has stores located at a plurality of geographic sites, only one advertisement for a store located at a first geographic site may be displayed. Thereafter, the advertisement for a store located at a second geographic site different from the first geographic site may be displayed.

U.S. Published Patent Application No. 2007/0208724 describes a system and method to facilitate expansion, disambiguation, and optimization of search queries over a network wherein an original query received from a user is parsed to obtain at least one query term. A plurality of keywords related contextually to one or more query terms are further retrieved from a database. Finally, a set of modified queries is generated, each modified query further comprising at least one query term and at least one retrieved keyword.

Thus, a system and method for context and community based customization for a user experience are needed.

BRIEF DESCRIPTION OF THE DRAWINGS

Embodiments illustrated by way of example and not limitation in the figures of the accompanying drawings, in which.

DETAILED DESCRIPTION

In the following description, for purposes of explanation, numerous specific details are set forth in order to provide a thorough understanding of some example embodiments. It will be evident, however, to one of ordinary skill in the art that the present invention may be practiced without these specific details.

As described further below, according to various example embodiments of the disclosed subject matter described and claimed herein, there is provided a system and method for context and community based customization for a user experience. The user experience includes a computer-implemented user interface and functionality supporting the processing capabilities provided for a computer user. Various embodiments are described below in connection with the figures provided herein.

In an example embodiment, an automated, community-driven, self-learning system uses collected user activity feedback to customize the serving of web page content to users in a context-sensitive manner. The system uses context input, including the user's search query/keywords, a related product or service category, a user/segment profile, site identifier (ID), domain, etc., and user activity feedback to perform the following customization operations:

1. choose among a variety of page types given the context input. The page types can include any type of webpage, window, frame, dialog box, user interface screen, textual or image display, or the like. Particular examples of such page types include, an all matching items (AMI) type, a dynamic landing page (DLP) type, a registration page, etc. It will be apparent to those of ordinary skill in the art the other page types can be similarly defined;
2. on the selected page type, populate a likely relevant set of widgets/modules (e.g. advertisements, links, selection lists, information blocks, etc.) for display on the page given the context input; and
3. for one or more widgets/modules, set a configuration for the widgets/modules (e.g. a sorting of the data) given the context input.

In various embodiments described herein, the automated, community-driven, self-learning system uses multi-dimensional input (context input) to produce multi-dimensional output (selections of page type, widget set, and/or configuration) all based on (customized from) a collection of activity feedback from a community of users gathered over time. As described herein, a widget (or module) is an interface element with which a computer user interacts, such as a window, frame, or a text box. The defining characteristic of a widget is to provide a single interaction point for the direct manipulation of a given kind of data. Widgets are visual basic building blocks which, when combined in an application, hold all the data processed by the application and the available interactions on this data.

In general, various embodiments use context input, including user and query information and user activity feedback to automatically generate and display the most relevant or most likely user-favored next page for that context using a predictive model. User information can include explicitly or implicitly obtained demographic information, explicitly or implicitly obtained user profile information, user transaction history, user activity history, and/or any other information explicitly or implicitly obtained that may indicate user preferences. Additionally, a perturbation engine is used to include, for some users, a slightly sub-optimal selection of page type, widget set, and/or configuration to cause the system to re-affirm the optimal selections and to introduce new selections that may have otherwise not been considered or selected. The perturbation engine enables a particular user or set of users to be exposed to a selection of page type, widget set, and/or configuration to which the user/users may not have otherwise been exposed. In some cases, a particular user or set of users can be exposed to a sub-optimal or under-performing selection of page type, widget set, and/or configuration.

Figure 1:
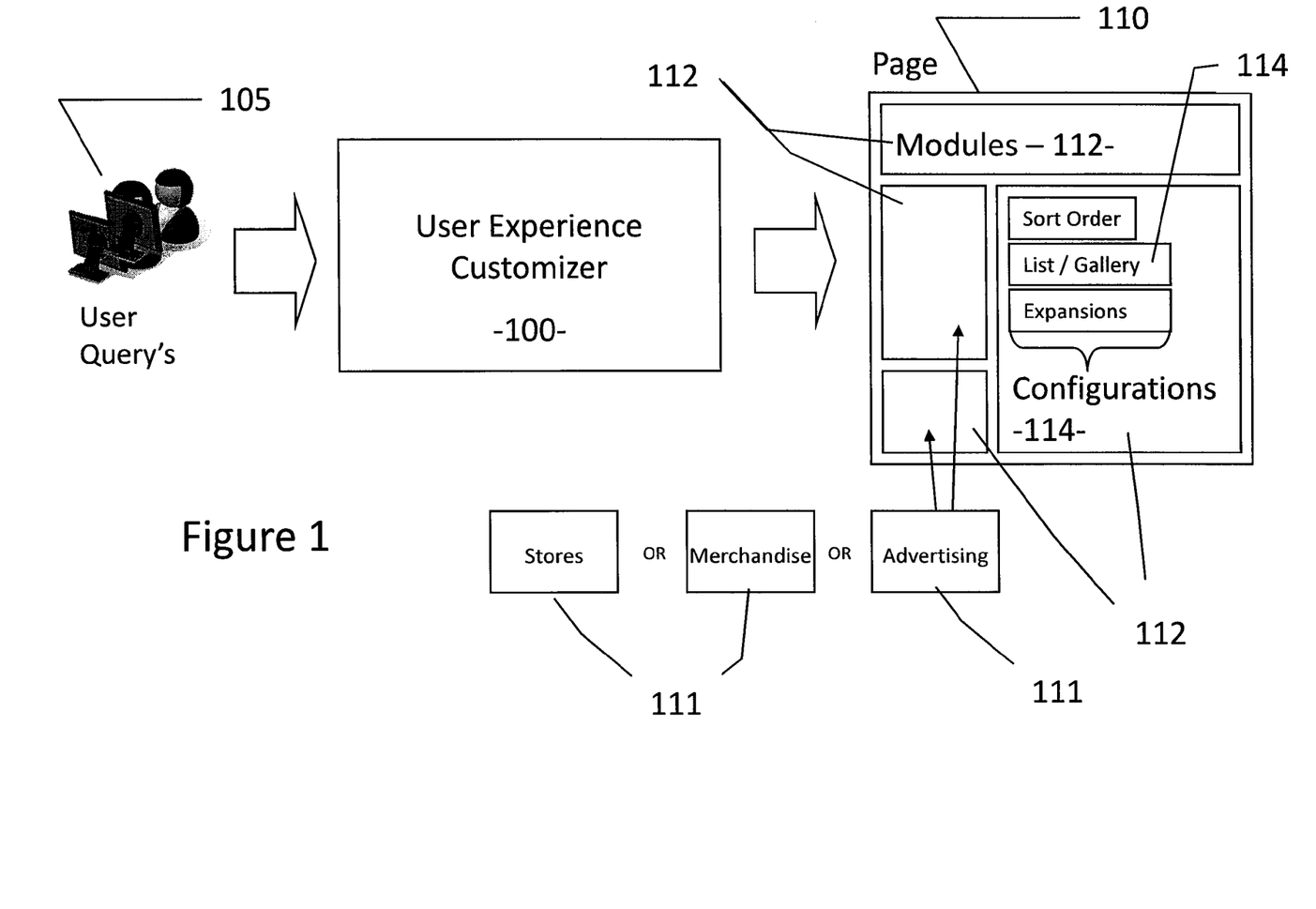
FIG. 1 illustrates an example of a particular embodiment of the automated, community-driven, self-learning system.

FIG. 1 illustrates an example of a particular embodiment of the automated, community-driven, self-learning system. In a community of users 105, networked computer users can use various servers (e.g. websites available via a public network such as the Internet) and search engines to perform various operations, such as searching for items using search queries and a search engine, performing e-commerce transactions, shopping or bidding on goods or services, browsing for information or items of interest, and the like. Typically, these user operations include some form of user input (e.g. a search query or set of keywords entered as text in an input field of a search engine). This user input provides one form of context input used by user experience customizer 100 to automatically customize the user experience for the user community. Other forms of context input collected and/or used by the user experience customizer 100 can include, a related product or service category, a user/segment profile or other user information, site identifier (ID), domain, etc. The related product or service category can include category(s) of products or services that relate to the searches or e-commerce transactions a user may have currently or previously submitted. A user/segment profile or other user information represents a user profile explicitly entered by a user or implicitly generated based on past user activity or behavior. The user profile can specify various demographic information, configurations, defaults, preferences, and the like associated with a particular user or group of users. User information can include explicitly or implicitly obtained demographic information, explicitly or implicitly obtained user profile or preference information, user transaction history, user activity history, and/or any other information explicitly or implicitly obtained that may indicate user preferences. The site identifier (ID) or domain name can specify a particular network location or geographic location associated with a user or group of users. It will be apparent to those of ordinary skill in the art that other information can be retrieved as context information or input associated with a particular point in time.

As shown in FIG. 1, this context input can be provided to user experience customizer 100. As will be described in more detail below, user experience customizer 100 includes predictive data and associated computer-implemented rules that can be applied to the context input to produce decisions or selections related to the type of user experience to present to the user that will represent the most relevant or most likely favored user experience for the user based on the context input. As a result, in a particular embodiment, a user experience, including user interface and available functionality in the form of a webpage 110 can be generated by user experience customizer 100. This webpage 110 can include a particular page type selected by the user experience customizer 100 from a plurality of available page types described above (e.g. AMI—all matching items, DLP—dynamic landing page, VIP—view item page, etc.). The page type can define the structure and/or arrangement of information and images provided on the webpage. Based on the selected page type, a plurality of modules or widgets 112 can be placed in the available locations of the selected page type. The particular modules placed in page 110 are selected by the user experience customizer 100 from a plurality of available page modules or widgets (e.g. list, graphic, data input, etc.). Once the selected modules 112 are placed in the page 110, the information content for each of the modules 112 is selected by the user experience customizer 100 from a plurality of available information content sources 111 (e.g. store locations, merchandise listings, advertising items, etc.). Once the content from the selected content sources are placed in the corresponding selected modules 112, the predictive model can further configure the information content displayed in modules 112 based on the context input. The particular configuration of information content displayed in modules 112 of page 110 is selected by the user experience customizer 100 from a plurality of available information content configurations (e.g. sort order, list or gallery display, expansion display, etc.).

Figure 2:
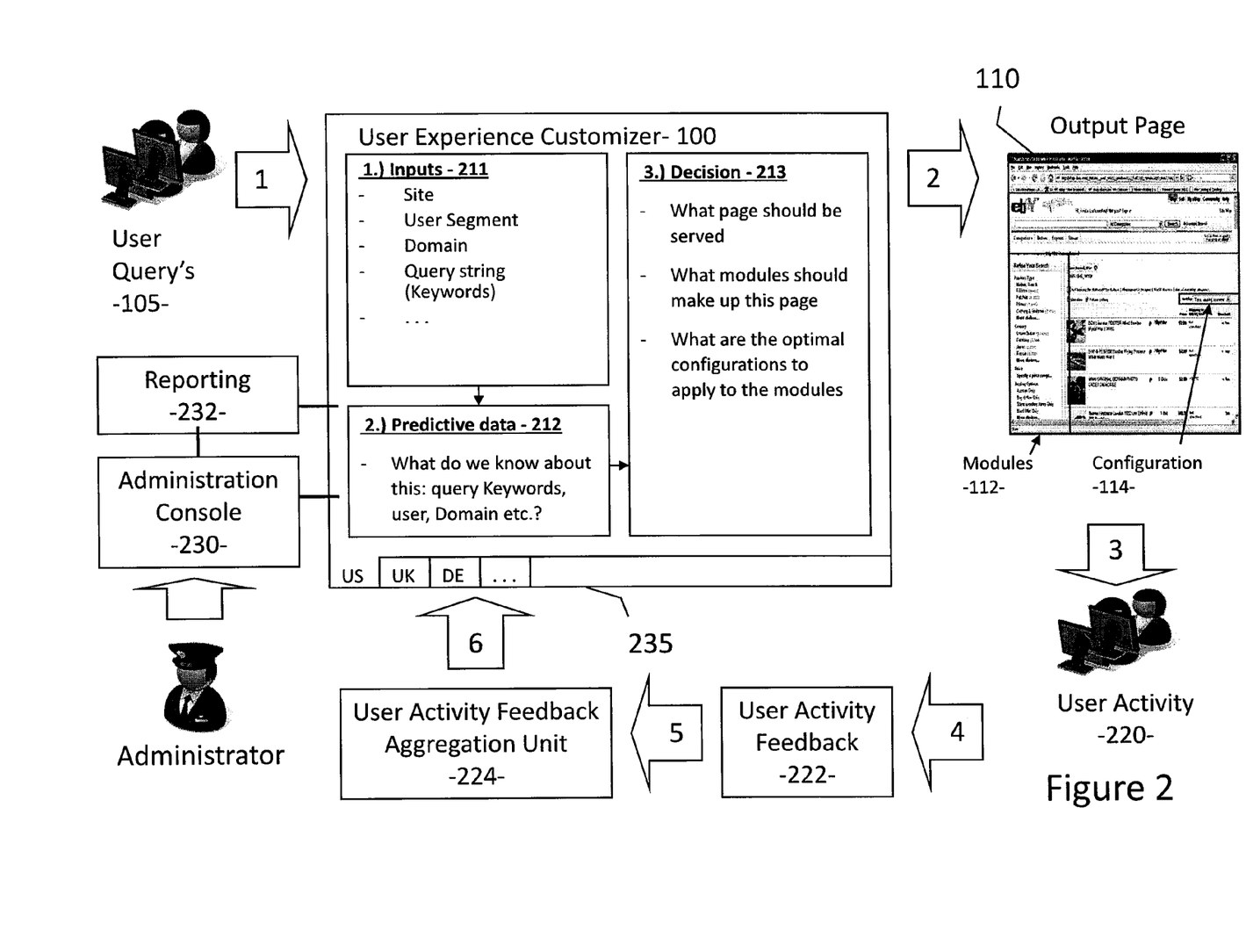
FIG. 2 illustrates the user experience customizer of a particular embodiment.

Referring now to FIG. 2, a more detailed system view of a particular embodiment is shown. As described above, context input 105 is provided to user experience customizer 100. The user experience customizer 100 of a particular embodiment is shown to include an input unit 211 to receive the context input 105 from the various sources described above. Once the context input is collected, aggregated, filtered, and structured by input unit 211, the processed context input is provided to predictive data unit 212. Predictive data unit 212 can take the processed context data and form correlations between the context data and the likely desirable structure and content provided in a corresponding user experience. These correlations can be resolved into decisions or selections made by the decision unit 213 based on the correlations made by the predictive data unit 212. The selections made by decision unit 213 include a selection of page type for the output page 110, a selection of modules 112 for the selected output page type 110, and a selection of configuration of content 114 displayed in the selected modules 112 of output page 110.

Once the user experience customizer 100 produces and displays the output page 110, the system of a particular embodiment shown in FIG. 2 can collect user activity feedback from a community of users 220 who interact with the output page 110. In the community of users 220, networked computer users can use various servers (e.g. websites available via a public network such as the Internet) to perform various operations on user interfaces (e.g. web pages, including output page 110), such as searching for items using search queries and a search engine, performing e-commerce transactions, shopping or bidding on goods or services, browsing for information or items of interest, and the like. These user-performed operations include various activities performed by the users, such as using a pointing device (e.g. computer mouse) to select, click, or mouseover various options, items, or links on a webpage, enter a search query or set of keywords, update a user profile, enter text into a user interface provided data entry field, browsing, shopping, bidding, or buying on-line, providing explicit feedback on a user experience, and other types of well-known user interactions with a computer-implemented user interface. These user activities can be recorded and saved in combination with information indicative of the structure and content of the webpage or user interface (e.g. page 110) with which the user was interacting at the time the user activity was recorded. This retained user activity feedback can be used to correlate the user's actions with the user interface acted upon. In this manner, user relevance or user desires is inferred from the user activity feedback. The use of this user activity feedback will be described in more detail below in connection with a particular embodiment.

As shown in FIG. 2, the user activity feedback 222 is collected from the user community 220 by a user activity feedback aggregation unit 224. The user activity feedback aggregation unit 224 produces structured and processed user activity feedback that can be used by the user experience customizer 100 to adjust the predictive data unit 212. For example, the rules implemented in predictive data unit 212 can be biased or weighted to produce selections that are more likely favored by the user community based on the user activity feedback 222.

As also shown in FIG. 2, user experience customizer 100 can also include a separate customizer for each of a plurality of region/sites as provided in tabs 235. Regions can include, for example, countries, states, geographical regions, and the like. Sites can include areas served by one or more computing sites, hubs, servers or server farms, and the like. Given a region/sites tab selection, the user experience customizer 100 can be configured to produce a different set of customized user interface pages 110 and different associated functionality that are specifically customized for a selected region/site and based on user activity feedback that is relevant for that selected region/site.

FIG. 2 also illustrates that the system of a particular embodiment can include an administrator access/control level that is accessed via an administration console 230. The administrator can cause the generation and display of various reports 232 that highlight the internal operation of the user experience customizer 100. The administration console 230 provides a view into how the user experience customizer 100 has made decisions over time. For example, the administration console 230 provides a view into how a decision was made to promote/demote a particular page type, module type, or configuration for a particular set of context input.

Figure 3:
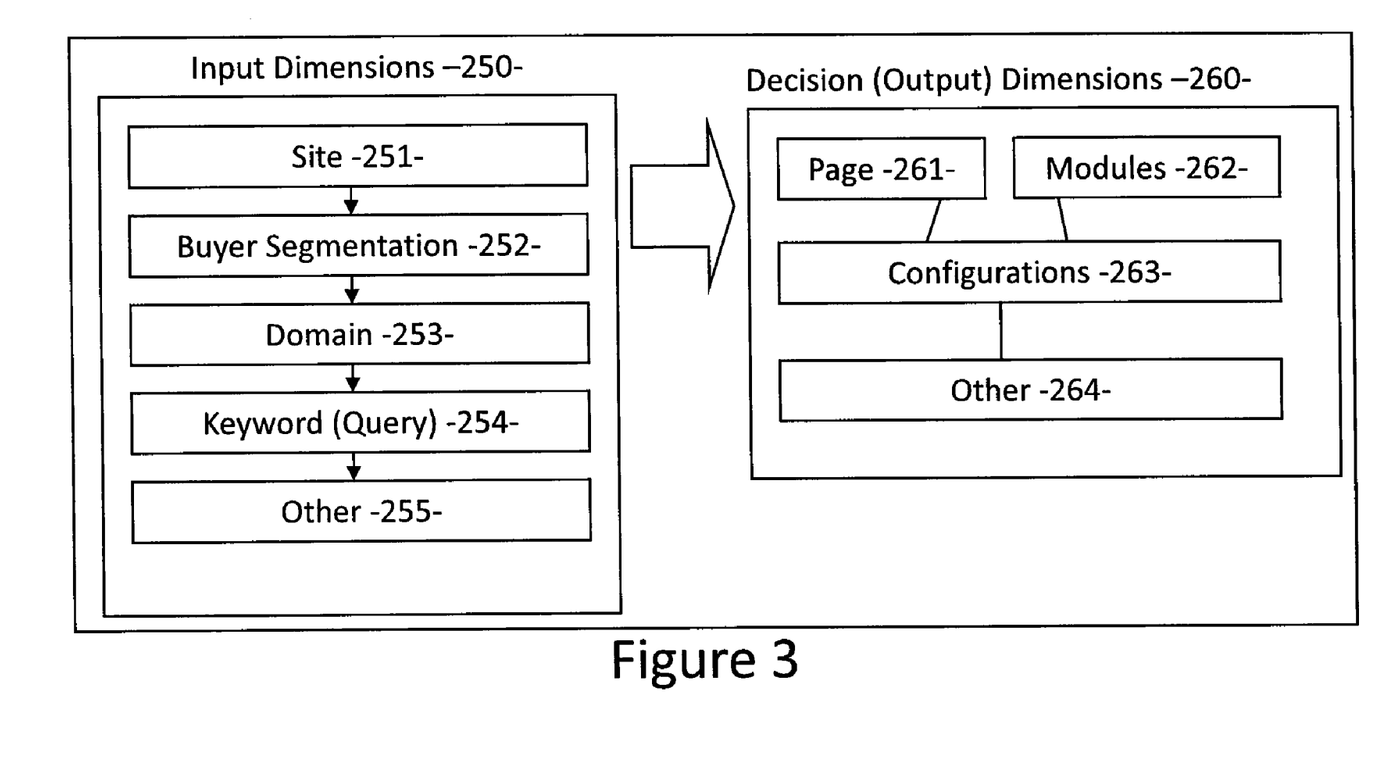
FIG. 3 illustrates the multiple input dimensions and multiple output dimensions of a particular embodiment.

Referring now to FIG. 3, the multiple input dimensions and multiple output dimensions of a particular embodiment are shown. The context input provided to user experience customizer 100 can include multiple dimensions including, for example, site 251, buyer segmentation 252, domain 253, keywords or search query 254, and other context related data 255. Site 25 information can include a user/buyer name, location, community code, IP address, user profile, and the like. Buyer segmentation 252 can include information that classifies the user/buyer into one or more purchaser/bidder/shopper groups based on pre-determined criteria. Domain 253 can include information identifying the server, website, merchant, or location, which the user/buyer has accessed. Keywords or search query 254 represents the user query 105 entered by a user. The items or dimensions included in the context information can be dynamically prioritized, re-ordered, and/or re-grouped so the user experience customizer 100 can receive the best context input available in a given situation. For example, if a particular item or dimension included in the context information does not provide sufficient or accurate information related to the particular dimension, the insufficient or inaccurate dimension can be re-ordered to a less valued position in the group of context information or the dimension can be eliminated from the context information altogether. In this manner, items or dimensions included in the context information can be ordered or grouped to fall back progressively to other sufficient and accurate dimensions in the group if a particular dimension does not provide sufficient or accurate information for the user experience customizer 100.

The output produced by the user experience customizer 100 can include multi-dimensional output, such as selections of page type 261, module/widget set 262, configuration 263, and/or other selections 264) all based on (customized from) a collection of user activity feedback from a community of users gathered over time. In general, various embodiments use context input, including user and query information and user activity feedback to automatically generate and display the most relevant next page for that context using a predictive model.

Figure 4:
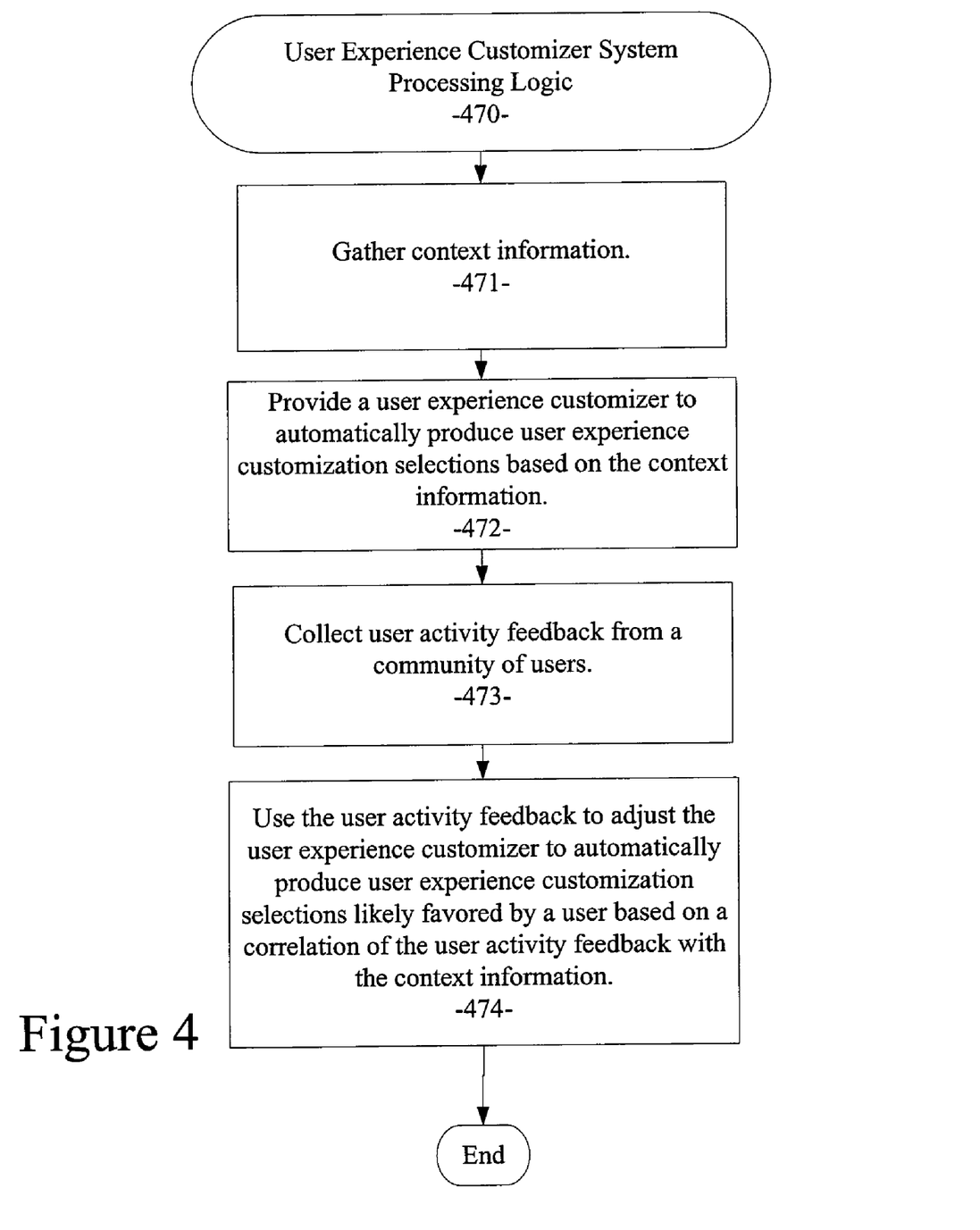
FIG. 4 illustrates a processing flow diagram for an example embodiment.

FIG. 4 illustrates a processing flow diagram for an example embodiment. In the embodiment shown, the system gathers context information (processing block 471); provides a user experience customizer to automatically produce user experience customization selections based on the context information (processing block 472); collects user activity feedback from a community of users (processing block 473); and uses the user activity feedback to adjust the user experience customizer to automatically produce user experience customization selections likely favored by a user based on a correlation of the user activity feedback with the context information (processing block 474).

Figure 5:
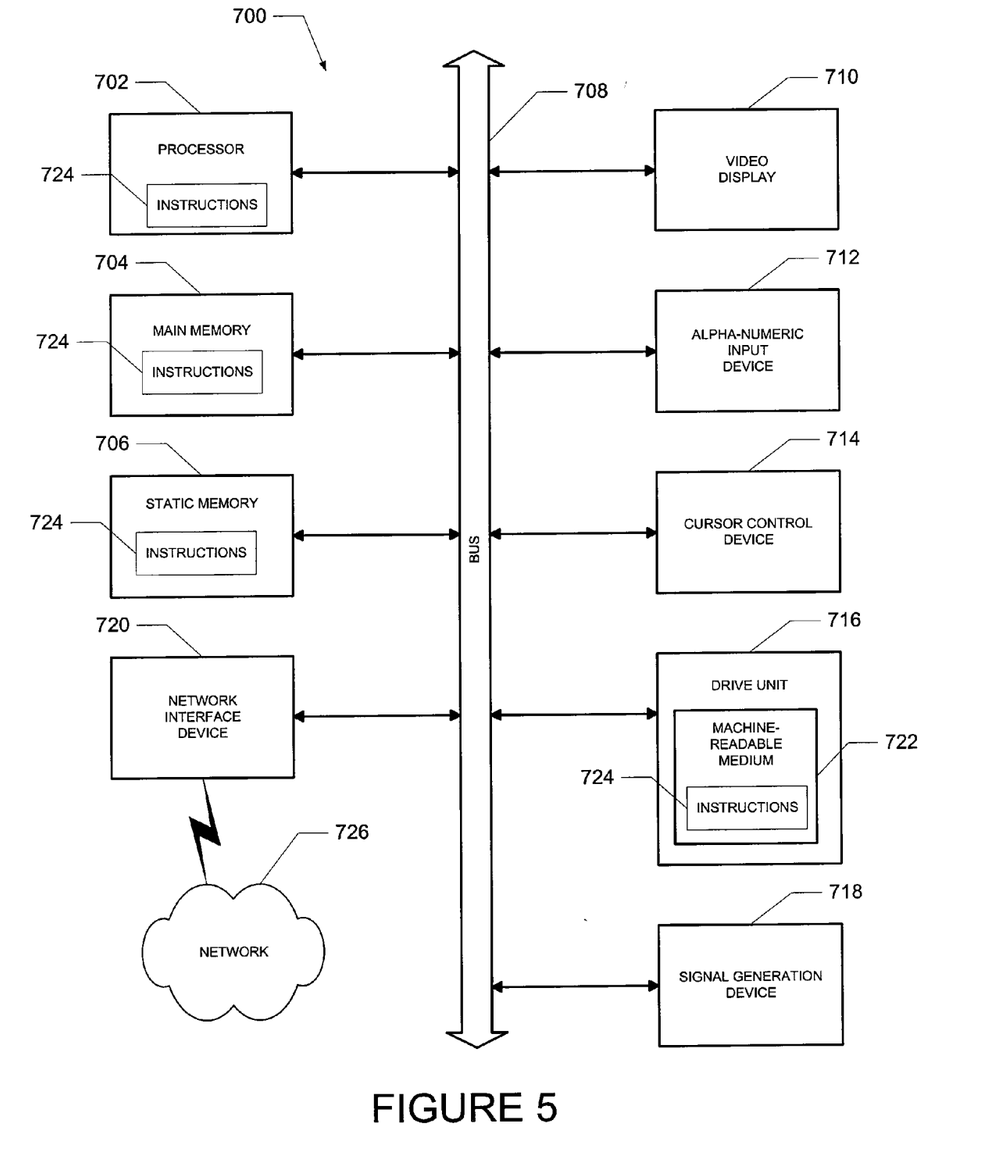
FIG. 5 shows a diagrammatic representation of a machine in the form of a computer system within which a set of instructions, for causing the machine to perform any one or more of the methodologies discussed herein, may be executed, according to an example embodiment.

FIG. 5 shows a diagrammatic representation of a machine in the example form of a computer system 700 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in client-server network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may farther include a video display unit 710 (e.g. a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical and magnetic media, and carrier wave signals. As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Thus, a system and method for context and community based customization for a user experience are disclosed. While the present invention has been described in terms of several example embodiments, those of ordinary skill in the art will recognize that the present invention is not limited to the embodiments described, but can be practiced with modification and alteration within the spirit and scope of the appended claims. The description herein is thus to be regarded as illustrative instead of limiting.

What is claimed is:

1. A method comprising:
gathering context information;
providing a user experience customizer to automatically produce user experience customization selections based on the context information, the user experience customization selections including selection of a particular user interface type from a plurality of available user interface types, the particular user interface type including a display page type for displaying information in a particular configuration to a user;
collecting, by use of a processor, user activity feedback from a community of users, the user activity feedback pertaining to user experiences with particular user interfaces for displaying information to users; and
using, by use of the processor, the user activity feedback to adjust the user experience customizer to automatically produce user experience customization selections likely favored by a user based on a correlation of the user activity feedback with the context information.

2. The method as claimed in claim 1 wherein the context information is selected from the group: site identifier, buyer segmentation information, domain identifier, and keywords/queries.

3. The method as claimed in claim 1 wherein the context information is selected from dimensions in the group: site identifier, buyer segmentation information, domain identifier, and keywords/queries, and the method further includes progressively falling back to other sufficient and accurate dimensions in the group if a particular dimension does not provide sufficient or accurate information.

4. The method as claimed in claim 1 wherein the user experience customization selections are selected from the group: page type, modules, and configurations.

5. The method as claimed in claim 4 wherein the page type includes an all matching items page type.

6. The method as claimed in claim 4 wherein the configurations include a sort order selection.

7. The method as claimed in claim 1 including providing a perturbation engine to perturb the automatically produced user experience customization selections.

8. The method as claimed in claim 7 wherein the perturbation engine exposes a user to user experience customization selections to which the user would not have otherwise been exposed.

9. The method as claimed in claim 7 wherein the perturbation engine exposes a user to sub-optimal user experience customization selections.

10. The method as claimed in claim 1 wherein the user activity feedback includes clicking on items, bidding or buying activity, or explicitly provided user feedback.

11. A user experience customizer comprising:
a processor;
an input unit, executable by the processor, to gather context information;
a predictive data unit, executable by the processor, to form correlations between the context data and a likely desirable structure and content provided in a corresponding user experience, the predictive data unit further to collect user activity feedback from a community of users and to adjust the user experience customizer based on the user activity feedback, the collected user activity feedback pertaining to user experiences with particular user interfaces for displaying information to users; and
a decision unit, executable by the processor, to automatically produce user experience customization selections based on a correlation of the user activity feedback with the context information, the user experience customization selections including selection of a particular user interface type from a plurality of available user interface types, the particular user interface type including a display page type for displaying information in a particular configuration to a user.

12. The user experience customizer as claimed in claim 11 wherein the context information is selected from the group: site identifier, buyer segmentation information, domain identifier, and keywords/queries.

13. The user experience customizer as claimed in claim 11 wherein the context information is selected from dimensions in the group: site identifier, buyer segmentation information, domain identifier, and keywords/queries, and the user experience customizer being further configured to progressively fall back to other sufficient and accurate dimensions in the group if a particular dimension does not provide sufficient or accurate information.

14. The user experience customizer as claimed in claim 11 wherein the user experience customization selections are selected from the group: page type, modules, and configurations.

15. The user experience customizer as claimed in claim 14 wherein the page type includes an all matching items page type.

16. The user experience customizer as claimed in claim 14 wherein the configurations include a sort order selection.

17. The user experience customizer as claimed in claim 11 being further configured to provide a perturbation engine to perturb the automatically produced user experience customization selections.

18. The user experience customizer as claimed in claim 17 wherein the perturbation engine exposes a user to user experience customization selections to which the user would not have otherwise been exposed.

19. The user experience customizer as claimed in claim 17 wherein the perturbation engine exposes a user to sub-optimal user experience customization selections.

20. The user experience customizer as claimed in claim 11 wherein the predictive data unit being further configured to collect user activity feedback including clicking on items, bidding or buying activity, or explicitly provided user feedback.

21. An article of manufacture comprising a machine-readable storage medium having machine executable instructions embedded thereon, which when executed by a machine, cause the machine to:
gather context information;
provide a user experience customizer to automatically produce user experience customization selections based on the context information, the user experience customization selections including selection of a particular user interface type from a plurality of available user interface types, the particular user interface type including a display page type for displaying information in a particular configuration to a user;
collect user activity feedback from a community of users, the user activity feedback pertaining to user experiences with particular user interfaces for displaying information to users; and
use the user activity feedback to adjust the user experience customizer to automatically produce user experience customization selections likely favored by a user based on a correlation of the user activity feedback with the context information.

22. The article of manufacture as claimed in claim 21 wherein the context information is selected from the group: site identifier, buyer segmentation information, domain identifier, and keywords/queries.

23. The article of manufacture as claimed in claim 21 wherein the context information is selected from dimensions in the group: site identifier, buyer segmentation information, domain identifier, and keywords/queries, and the article of manufacture being further configured to progressively fall back to other sufficient and accurate dimensions in the group if a particular dimension does not provide sufficient or accurate information.

24. The article of manufacture as claimed in claim 21 wherein the user experience customization selections are selected from the group: page type, modules, and configurations.

25. The article of manufacture as claimed in claim 24 wherein the page type includes an all matching items page type.

26. The article of manufacture as claimed in claim 24 wherein the configurations include a sort order selection.

* * * * *

UNITED STATES PATENT AND TRADEMARK OFFICE
CERTIFICATE OF CORRECTION

PATENT NO. : 8,359,237 B2  
APPLICATION NO. : 12/126709  
DATED : January 22, 2013  
INVENTOR(S) : Dalal et al.

Page 1 of 1

It is certified that error appears in the above-identified patent and that said Letters Patent is hereby corrected as shown below:

In the Specification

In column 2, line 54, delete "display,or" and insert --display, or--, therefor

In column 5, line 62, delete "25" and insert --251--, therefor

In column 6, line 66, delete "farther" and insert --further--, therefor

Signed and Sealed this  
Second Day of December, 2014

Michelle K. Lee  
*Deputy Director of the United States Patent and Trademark Office*